United States Patent [19]

Hauch

[11] Patent Number: 4,907,959

[45] Date of Patent: Mar. 13, 1990

[54] HYDRAULIC PRESS HAVING INTEGRATED COLUMN CLAMPS AND ACTUATORS

[75] Inventor: David A. Hauch, Afton, Minn.

[73] Assignee: MTS Systems Corporation, Eden Prairie, Minn.

[21] Appl. No.: 224,198

[22] Filed: Jul. 21, 1988

Related U.S. Application Data

[63] Continuation of Ser. No. 34,381, Apr. 2, 1987, abandoned.

[51] Int. Cl.⁴ ........................................ A01J 21/00

[52] U.S. Cl. ........................ 425/406; 425/450.1; 100/219

[58] Field of Search ............... 425/150, 193, 195, 406, 425/450.1, 451.9, 451.2; 100/219, 258 A, 918

[56] References Cited

U.S. PATENT DOCUMENTS

| | | | |
|---|---|---|---|
| 3,449,795 | 6/1969 | Fischbach | 425/166 |
| 4,106,885 | 8/1978 | Poncet | 425/450.1 |
| 4,123,929 | 11/1978 | Heydts | 72/453.08 |
| 4,457,684 | 7/1984 | Gram | 425/451.9 |
| 4,509,910 | 4/1985 | Peterson | 425/451.9 |
| 4,565,517 | 1/1986 | Brinkman et al. | 425/451.2 |
| 4,610,618 | 9/1986 | Schmidts et al. | 425/383 |
| 4,643,663 | 2/1987 | Bowles et al. | 425/406 |

FOREIGN PATENT DOCUMENTS 0228912 7/1987 European Pat. Off. .

*Primary Examiner*—Bernard Nozick
*Attorney, Agent, or Firm*—Kinney & Lange

[57] ABSTRACT

A hydraulic press has smooth columns that mount relatively movable mold support platens on a base and a ram or cross head. The bed and ram are rigid, low deflection fabricated members mounted on the columns. The clamps that clamp the movable ram in molding position have integrated pressing and stripping cylinders for performing the actual molding operation. The movable ram member is opened and closed with actuators separate from the molding force cylinders. The construction permits making a lighter weight press without a heavy crown at the top of the press.

24 Claims, 5 Drawing Sheets

HYDRAULIC PRESS HAVING INTEGRATED COLUMN CLAMPS AND ACTUATORS

This is a continuation of application Ser. No. 034,381, filed Apr. 2, 1987, now abandoned.

BACKGROUND OF THE INVENTION

1. Field of the Invention.

The present invention relates to a hydraulic press construction wherein the press is rigid, and the actual pressing cylinders are integrated into clamps which are carried by a movable member that can be opened and closed for charging a mold, and for removing a finished part.

2. Description of the Prior Art.

Various hydraulic presses for forming materials have been advanced, including ones that have rigid cross heads that are clamped onto smooth columns, for example, a press as shown in U.S. Pat. No. 4,457,684, issued July 3, 1984. That specification shows a hydraulic press which has clamps on the cross head to clamp the cross head in place, and separate molding cylinders that are positioned below a lower platen, and which provides a wide range of movability during the press operation. The cross head construction shown in U.S. Pat. No. 4,457,684 also shows a rigid, relatively light weight cross head which distributes the stress substantially uniformly across the supported platen. the ram and bed of the present press accomplishes distribution of stress as well, but in a different manner.

Hydraulically operated sleeve clamps that clamp onto smooth columns, and have two interfitting parts that prevent slip between the two parts are shown in U.S. Pat. No. 4,509,910, issued Apr. 9, 1985.

U.S. Pat. No. 3,449,795 shows a type of a mold closer that has a clamp that is hydraulically operated to clamp to a smooth column, and which has a built-in pressure cylinder. This patent also shows a configuration for latching members into existing grooves in columns, which are hydraulically operated as well.

Further, U.S. Pat. No. 4,565,517 illustrates a hydraulic press that has clamps with integrated pressing cylinders, but arranged in a substantially different configuration from the present device and having a requirement for a heavy press frame.

SUMMARY OF THE INVENTION

The present invention relates to a hydraulic press for molding materials under servovalve controls, that utilizes two relatively movable platens guided relative to each other on smooth columns, and wherein one of the platens has clamps on it to permit clamping the one platen in a desired position for molding. The clamps permit holding the movable platen at an infinite number of locations along the columns.

The molding forces are provided by hydraulic actuator assemblies that are integrated with the clamps and act directly through the columns and clamps that position the two platens relative to each other. The clamps hold the columns securely, and the actuators used can be operated in opposite directions for stripping the part after the molding cycle is completed.

The piston in the actuator integrated into clamps and used for molding and stripping is permitted to move laterally relative to the column to accommodate misalignment as well, while providing high mold forces and independent guiding of the columns relative to the fixed bed.

Because the clamps provide for infinite attachment locations of the molding pistons to the columns, while allowing some lateral float, the press is more adaptable to different loading and movement condition situations and therefore requires less complex control.

The press construction provides for directly guiding and powering the two press platens relative to each other through a set of two or four round columns. This simplifies the structure, minimizes the corrections that have to be made because of bending loads, and also simplifies the need for providing for lateral "float" between the mold parts.

The bed and the movable ram platen can be designed to maximize flatness under load utilizing simple fabrication techniques, but with great rigidity in operation. Thermal isolation between the ram and/or bed and the mold is also provided because there is a minimum contact between the respective platen and its support locations, which in turn minimizes the need for insulating the hot molds used for molding sheet molding compound.

A limited swivel connection is provided between the ram and the columns, to permit for some misalignment without damaging the press. The columns are guided for some angular movement through safety containment rings that can break away if there is severe, unwanted tilting of the ram with respect to the columns.

DETAILED DESCRIPTION OF THE PREFERRED EMBODIMENTS

Figure 2:
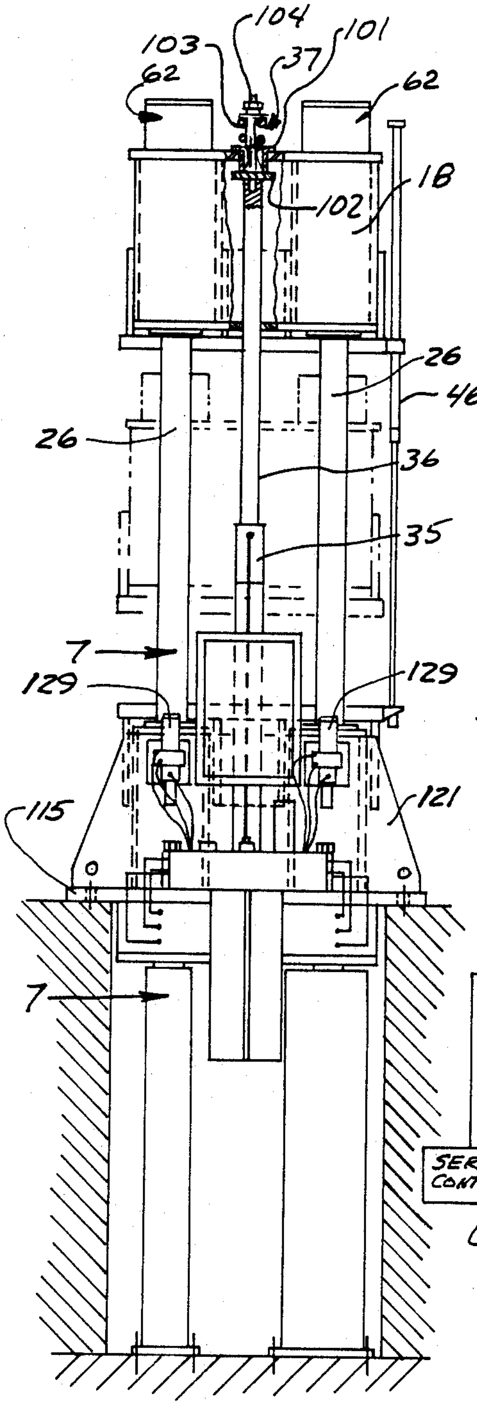
FIG. 2 is a side elevational view of the device of FIG. 1.

A press assembly indicated generally at 15 comprises a bed or base indicated generally at 16 that is suitably supported onto a mounting member, such as a concrete base 17, that has a recess for accommodating the movable portions of the press assembly and which provides an adequate foundation for the press assembly. The bed 16 is made substantially the same as an upper ram or movable crosshead 18.

The bed 16 supports a lower platen 20 mounted thereon and having an upwardly facing support surface, which is used to mount a mold part 21 which is shown only schematically. The movable ram 18 has an upper movable platen 22 that in turn mounts a second mold part 23 that also is shown only schematically. The platens, and the mounting thereof, will be more fully explained.

The ram 18 supports, and carries with it a plurality of smooth columns 26. The columns 26 (there are four as shown, but there could be only 2 laterally spaced apart, if desired) are slidably mounted with respect to the bed 16, and pass through hydraulic press power and guidance modules 30 at each of the four corners of the bed 16. The press power and guidance modules 30 slidably receive the columns 26, and have clamp assemblies shown at 120 in FIG. 7 therein which are operated in response to control signals to releasably clamp onto the columns 26 to hold the ram 18 in a desired position relative to the bed 16.

Figure 7:
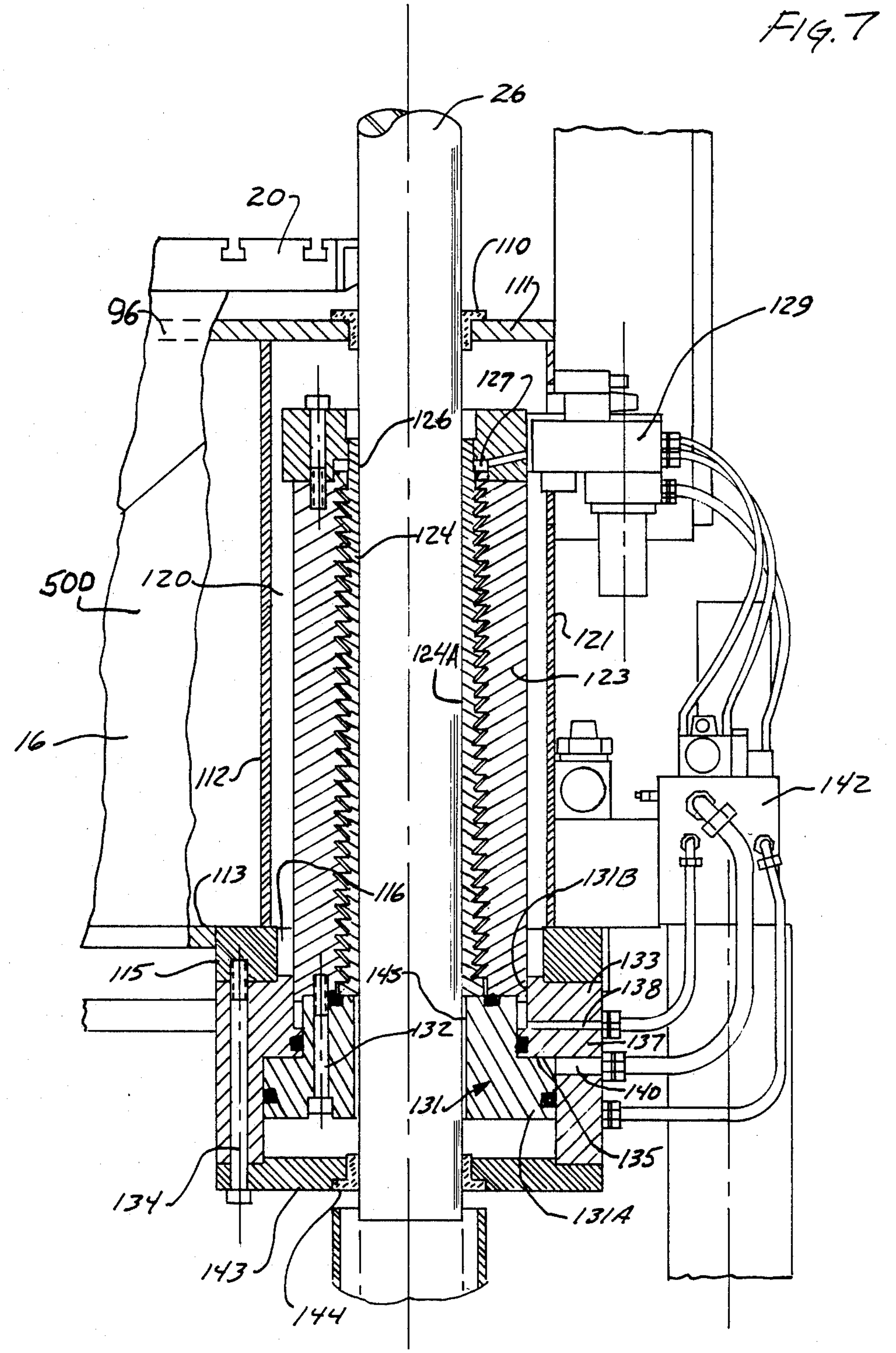
FIG. 7 is a sectional view taken generally along line 7—7 in FIG. 2.

The pressing force is provided by power cylinder and piston assemblies shown in FIG. 7 at 31 and 33 that are integrated in the modules 30, but the large mold opening and closing movements of the ram relative to the bed are controlled through a pair of hydraulic actuators indicated generally at 35, one at each of the opposite ends of the ram and bed. The actuators are fixed to the base 16, and have an extendable and retractable rod 36 that is coupled as shown at 37 to the ram 18, on each end of the ram, as can be seen in FIG. 2. The coupling 37 forms a spring loaded connection shown at 101, 102, 103, and 104 in FIG. 2, and explained later in this specification that permits slight upward movement of the ram from the upper end of the actuator rods 36. The actuators 35 are controlled through suitable servovalve controls indicated schematically at 40 that can be similar to those shown in U.S. Pat. No. 4,457,684. The sequencing of the operations of the actuators 35, and the clamp assemblies 120 and power pistons and cylinders 131 and 133 contained in the modules 30 can be carried out with a preset program.

Protective sleeves indicated generally at 42 and 43 are provided in the recess in base 17. Sleeves 42 and 43 are to protect the lower ends of columns 26 from damage when they protrude downwardly below the press power and guidance modules 30. A safety lock system 39 is provided on the ends of two of the columns to lock the ram against dropping accidentally from its open or raised position. As shown, a ring 39A has an internally keyed recess and is supported below one of the modules 30, and a complemental external key is on a member 39B rotatably mounted on the lower end of one column. The member 39B can be rotated about the axis of the column so the internal key slot in ring 39A and the key member 39B do not align. Thus, if the actuators 35 failed, the ram would be supported through safety member 39.

A suitable position transducer 46 is provided at each of the corners of the press adjacent each column to provide a signal representing the position of the upper platen 22 and provide precise position signals to controls 40 showing the relative positions of the lower platen 20 and the mold part carried thereby and the mold part carried on the upper platen 22. The position transducers thus can be used to control the actuators 35 and also to control the molding force generating actuators, as will be explained. The position of ram 18 will be known and can be controlled through the servocontrols 40.

Figure 3:
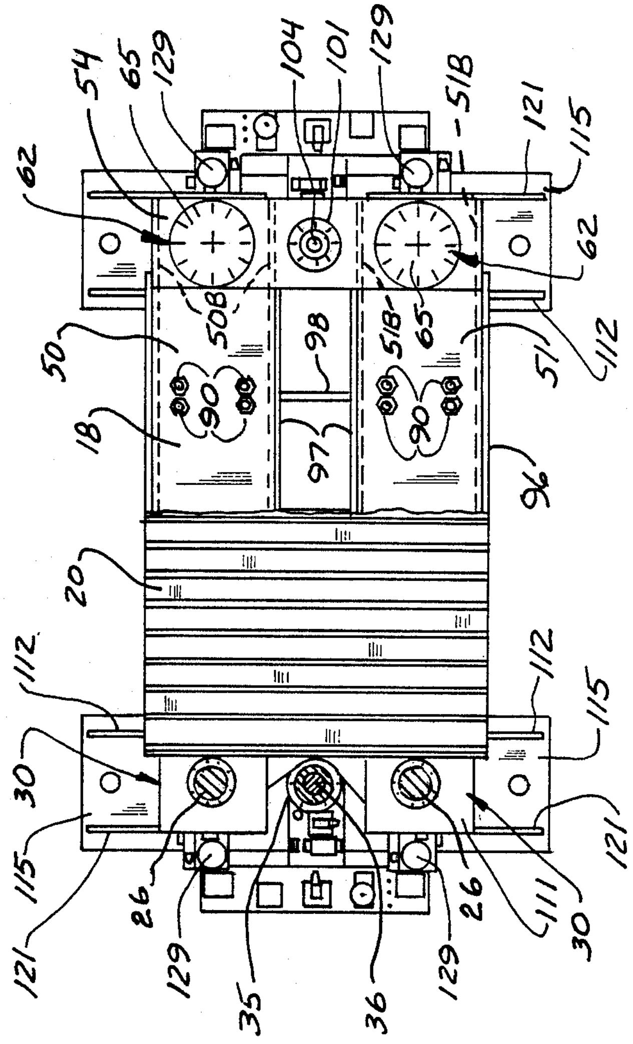
FIG. 3 is a part sectional, part plan view taken as on line 3—3 in FIG. 1.
Figures 4, 5:
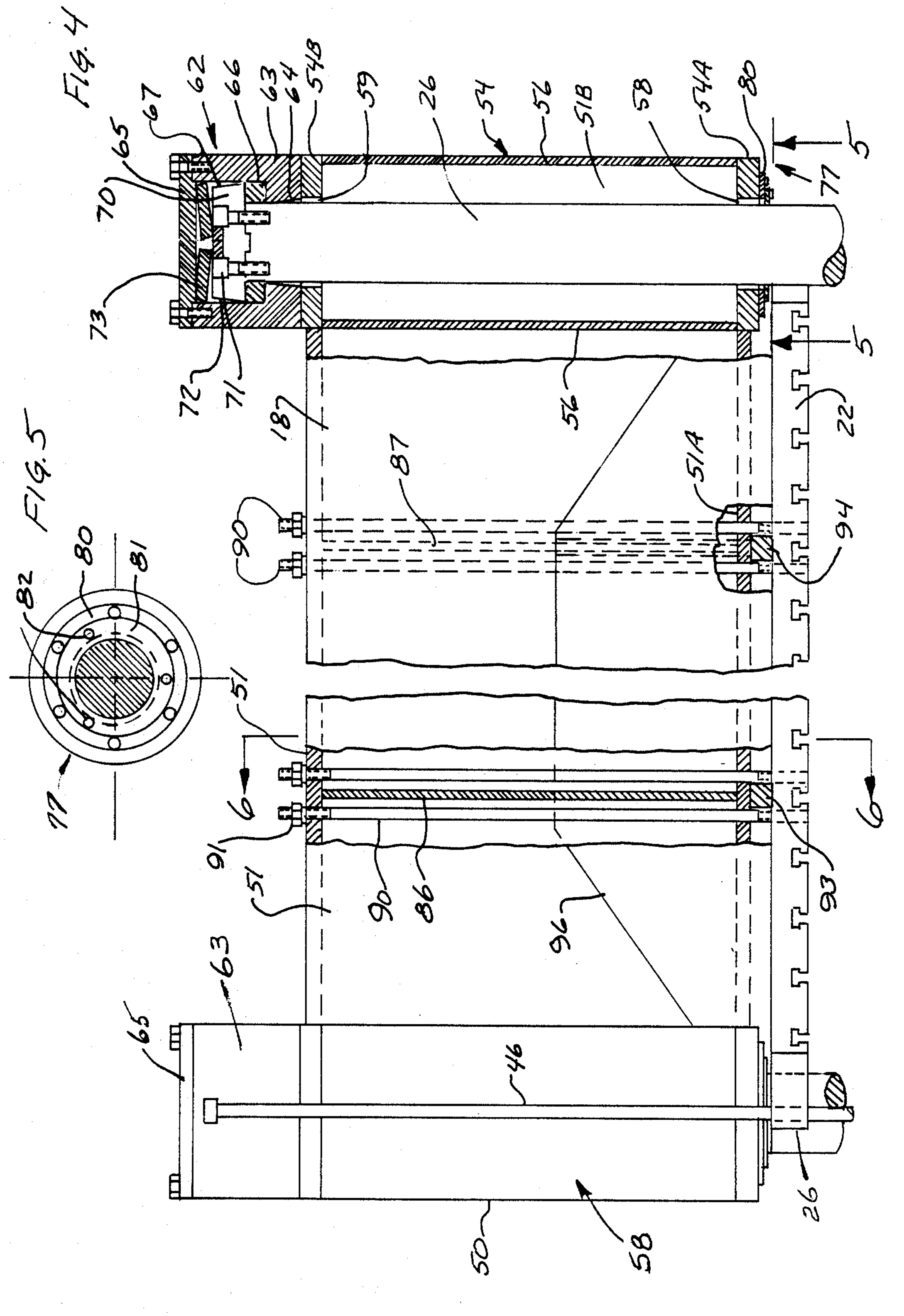
FIG. 4 is an enlarged scale front elevational view of an upper ram shown in FIG. 1, with parts in section and parts broken away.
FIG. 5 is a sectional view taken as on line 5—5 in FIG. 4.
Figure 6:
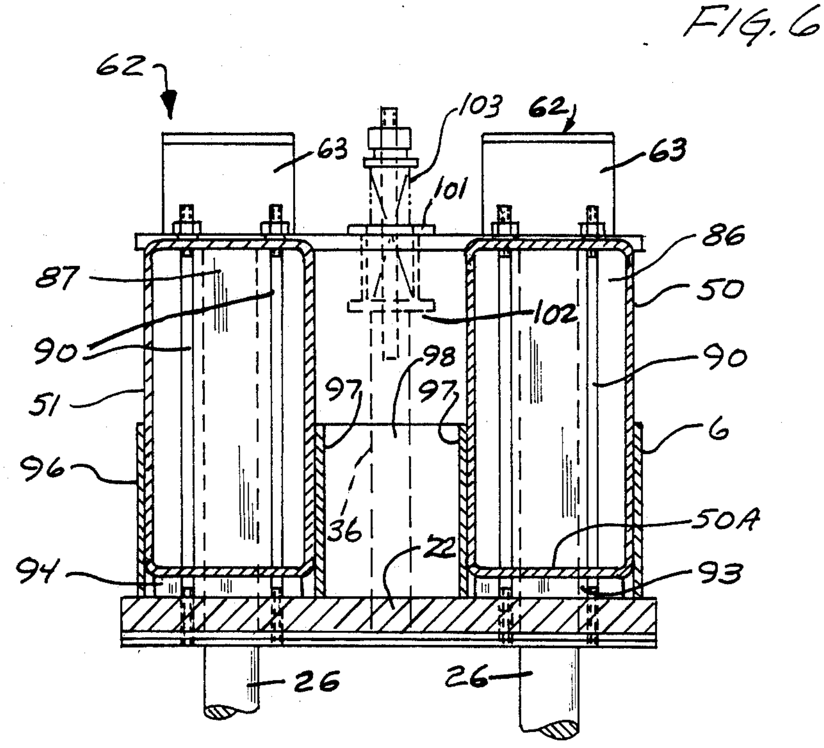
FIG. 6 is a sectional view taken as on line 6—6 in FIG. 4.

Both the bed 16 and the ram 18 can be made in a fabricated construction designed to minimize deflection in use, as perhaps is best illustrated in FIGS. 3, 4 and 6.

As shown in FIG. 3, where the upper ram 18 is broken away, platen 20 is shown in partial view. This comprises a lower platen on which the mold part 21 is mounted. The upper ram 18 comprises a pair of rectangular cross section ram frame tubes (see also FIG. 6) 50 and 51, which are side-by-side and parallel, and extend laterally or side-to-side across the press between the columns 26 at opposite ends of the press. The ram frame tubes 50 and 51 can have suitable wall thicknesses, and may be made of suitable material so that they are of adequate strength. End supports 54 are supported on the vertically extending side walls of the tubes 50 and 51 at each end of the ram that extend fore and aft across the ends of the two ram frame tubes. Each end support includes a lower or bottom guide plate 54A, and an upper or top guide plate 54B on each end support. The guide plates are supported on the vertically extending side walls of tubes 50 and 51. The top and bottom walls of the tubes are notched away to receive the top and bottom plates 54A and 54B and these plates are welded to the vertical walls of the cross tubes to carry vertical loads from the columns 26 directly into the tube side walls. Such a wall portion can be seen at 51B in FIG. 4 and in dotted lines at 51B and 50B in FIG. 3. The top and bottom guide plates 54A and 54B are also supported on vertically extending end plates 56 and 57, respectively, which are welded to the side walls of the tubes 50' and 51 to block the tube openings to make a solid assembly.

The lower guide plates 54A at each end of the ram have openings shown at 58 through which the respective columns 26 can pass. There is one of the openings 58 at the front and one at the rear on each of the plates 54A. Upper plates 54B have openings 59 therein through which the columns 26 also pass, and as can be seen the openings 58 and 59 can be of suitable size to provide for some lateral movement of the columns relative to the plates 54A and 54B.

The columns 26 are each supported with respect to the respective top plate 54B in a limited motion swivel assembly indicated generally at 62. This swivel assembly comprises a housing 63 for each of the columns, which is fixed to the top guide plate 54B. The housing 63 has a generally tapered or conical shaped opening 64 in the bottom thereof aligning with the openings 59 in the plates 54B. The opening 64 increase in size in downward direction. Each housing 63 can be attached to the respective plate 54B with a plurality of capscrews if desired. A cover 65 is held on the housing to enclose an internal chamber 67 in each housing 63. The upper ends of columns 26 each have a cap member 70 fastened thereto with suitable capscrews. Each cap member 70 has a shoulder that overlies an elastomeric swivel pad 66 located in each respective chamber 67. Each cap has a tapered outer peripheral edge surface 72, so that as the attached column 26 tends to move laterally there will be clearance to ermit the cap 70 to tilt with respect to its respective chamber 67. The elastomeric pad is contained by the walls of the chamber 67. The suitable Belleville spring 73 is provided below the cover 65 of each chamber 67 and exerts a force between the top of the respective cap 70 and the cover 65 to keep the ram 18 held upwardly with each swivel pad 66 supporting its associated cap member 70 under this spring load.

A containment guide ring assembly 77 is attached to the lower side of the lower plate 54A, surrounding each of the openings 58 to provide a lower sliding guide of the column with respect to the ram until an excessive tilting of the ram. The containment guide ring assembly 77 includes a base ring 80 that is bolted to the underside of the lower guide plate 54A, with a separate one of the base rings 80 surrounding each of the columns 26. In addition, a shear ring 81 is then mounted to the base ring 80, and has an opening of smaller size than the base ring but still provides for an opening that slidably guides the respective column 26.

As shown in FIG. 5, the shear ring 81 is held in place with a suitable number of shear bolts of desired size indicated at 82 that are threaded into the ring 80. The shear bolts 82 are selected so that they will shear before misalignment of the columns causes distortion of the platen or bending of the columns, but they are sufficiently strong so they carry normal guiding loads so that there is accurate guiding of the ram as the columns slide in the modules 30. Some shifting from side to side of the ram can be accommodated by the columns and the ram because the swivel pad 66 provides for some misalignment. The ram base and column can move as a parallelogram slighly (side-to-side or fore and aft) without damage. The construction of the individual power press cylinders will accommodate some such movement as do the swivel assemblies 62.

The upper platen 22 is also shown in FIG. 4, along with the supports for supporting it on the ram 18 (supporting lower platen 20 on bed 16 is done in the same way). Ram frame cross tubes 50 and 51 are each provided with interior bulkhead walls indicated at 86 and 87 adjacent opposite ends of each of the tubes 50 and 51. The bulkheads 86 and 87 are welded in place, and access can be obtained from the ends of the tubes 50 and 51 in order to permit welding the bulkheads in place. The bulkheads reinforce the walls of the tubes 50 and 51, and on each side of each of the bulkheads in each of the tubes there are two draw bolts indicated generally at 90 arranged in pairs. There are eight draw bolts on each of the tubes, four of them adjacent each of the bulkheads 86 and 87, respectively.

The draw bolts 90 extend downwardly through the lower wall of the respective tubes 50 and 51 and are threadably mounted in the platen 22, as shown in FIG. 4, so that they are secured to the platen. The bolts 90 pass through openings in the upper and lower walls of the tubes 50 and 51, and are provided with nuts 91 at the upper side of the tubes so that the draw bolts 90 can be tightened.

The platen 22 is spaced away from the lower wall 50A and 51A of the respective ram frame tubes with load pads or blocks 93 and 94, respectively, that align with the respective bulk head 86 and 87. The platen is clamped against the load pads with the draw bolts 90. The load pads or blocks support the platen in a spaced relationship to the lower walls 50A and 51A. Platen 22 is provided with a plurality of welded-on upstanding flanges or gussets indicated at 96 and 97 that slide over the outer sides of the two ram frame tubes. The gussets or walls 96 and 97 slip up alongside the respective tubes 50 and 51, and the platen 22 is forced against the bottom of the load pads 93 and 94 and clamped tightly in place. Additional bridging plates indicated at 98 are provided between the walls 97 in the space between the tubes 50 and 51 for rigidity. The compression loads that are exerted on the platten are carried to the load pads and are distributed across the platen 22 (and in the same way on platen 20) through the gussets or walls 96 and 97. The ends of the gussets 96 and 97 are trimmed off so that they clear the end guide assemblies of the ram.

In the construction shown, the ram is light weight because of the fabricated construction. Having the two load pads or blocks directly under the bulkheads, and using the fabricated cross tube ram main frame assembly, results in a very shallow deflection curve across the width of the platen, as shown in FIG. 8.

Figure 8:
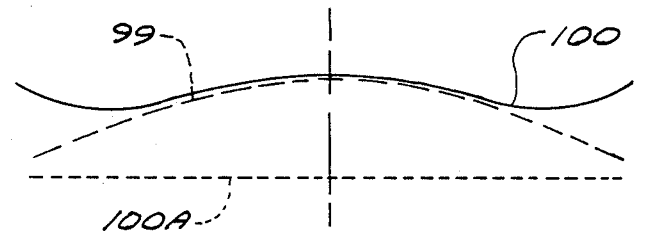
FIG. 8 is a typical graphical representation of the deflection of the platens under load.

In FIG. 8, representation of a deflection curve for a conventionally supported ram and platen (clamped to the columns at its opposite ends) is shown at 99, and it can be seen that the maximum deflection is thus in the center of the platen and that the amount of deflection diminishes toward the clamps that clamp onto the columns. The deflection curve for the cross head shown in FIG. 4 under pressing loads is illustrated by curve 100 in FIG. 8. It can be seen that with relation to the reference line indicated at 100A, at the center of the ram the deflection of the platen 22 or 20 is substantially the same as for a conventional supported ram. The deflection of the platens 20 or 22 reduces at the location of the load pads 93 and 94. At the outer edges of the present platen 20 or 22, deflection from the baseline 100A increases again because the outer edges of the platens 20 or 22 are not supported directly on the ram. The deflection of the platens from the baseline is not substantially diminished from conventional design, but the distortion or deflection from a "best" or average plane is diminished substantially. The distortion of the mold is therefore reduced, which is beneficial in compression molding operation.

The platen deflection from a best fit plane using a ram or cross head of conventional design, conventionally supported on its outer end and having the same smount of steel or weight as the ram disclosed herein is greater than the present design.

The connection between the actuator rod 36 on each end of the ram 18, which is shown in FIG. 2 at 37, provides a direct compression bearing collar 101 fixed to the respective top plate 54B. A plate 102 that is mounted onto the rod 36 bears against its respective collar and a spring 103 is mounted over a bolt 104 that is threaded into the respective rod 36, so that a spring load urges the plate 102 against the sleeve portion of collar 101. The weight of the ram is carried by the compression connection of the plate 102 against the sleeve portion of collar 101. The spring 103 can compress slightly to permit the ram to move away from the plate 102 under forces acting on the ram.

When the actuators 35 move the ram 18 up and down, the columns 26 slide in the press power and guidance modules 30, and as can be seen in FIG. 7 in particular, the modules 30 each guide one of the columns independently of an associated power operated piston and clamp assembly.

One corner of the bed 16 is shown in FIG. 7. The column 26 is slidably guided in a suitable bearing 110 that is mounted in a top wall 111 of an end portion of the bed 16 that is constructed similarly to the supports 54 for the ram. The construction is modified so that it will accommodate the needs of the power and guidance module. The guide bearing 110 insures that the column 26 is stably supported and guided relative to the bed 16. At the lower end of the module 30, a frame plate 115 is welded to the tubes that support the bed. Webs or wall 112 can be welded into the tubes forming the bed. Such a tube is indicated at 50D in FIG. 7 and the bottom wall of tube 50D is shown at 113. Frame plate 115 is securely fastened in place, and is used for reacting molding forces. The frame plate 115 is a type of a ring, and can be square in outer configuration, and is supported by the vertical walls of the cross tube, such as 50D, that the frame is associated with. The frame plate 115 has a central opening 116 therein. A clamp assembly indicated generally at 120 is mounted between wall 112 and an outer end wall 121 that is welded in the end of the associated tube of the bed. The clamp assembly 120 fits within the opening 116 of the frame 115. The clamp assembly 120 is similar to that shown in U.S. Pat. No. 4,509,910.

The clamp assembly 120 includes an outer housing 123 and an inner clamping sleeve 124. The clamping sleeve 124 has an interior surface 124A that slidably receives the column 26, until such time as a pressurized fluid is introduced into a chamber indicated at 127 that is defined between the outer housing 123 and the sleeve 124. The chamber is formed between interfitting or interlocking threads or wedges between the housing 123 and clamping sleeve 124. The interfitting members provide for a non-slip arrangement between these two clamp sections, and when fluid under pressure is introduced into the chamber 127, the sleeve 124 will be shrunk down onto the column 26 to positively clamp on the column. The sleeve 124 will contract radially, but cannot move axially relative to the housing 123. Fluid under pressure in the chamber 127 can be controlled through a servovalve 129 that is controlled by the servovalve controls 40.

In this form of the invention, the lower end of the clamp housing 123, which extends down below the level of the frame plate 115, has a piston 131 fixedly mounted thereon with suitable capscrews 132. The piston 131 fits within the interior of a cylinder assembly 133 that in turn is fixedly attached with suitable capscrews 134 to the frame plate 115. The cylinder assembly has an enlarged chamber indicated at 135 in which the head 131A of the piston 131 fits. The piston has a neck 131B that slidably fits within an opening in an annular flange or shoulder 137 on the interior of the cylinder 133.

The upper portion of the cylinder assembly 133, which surrounds the neck 131B has a port 138 leading thereto, and the lower chamber portion 135 has a port 140 leading thereto. The ports 138 and 140 are connected to a servovalve indicated at 142 so fluid under pressure can be provided selectively to the ports. Suitable seals are provided relative to the flange 137 of the cylinder and piston neck 131B, as well as between the outer surface of the piston head 131A and the interior wall of the chamber 135. Additionally, a lower wall 143 is supported on the cylinder 133 with suitable capscrews, and has a bearing 144 mounted thereon, that slidably receives the column 26 to guide the column 26 relative to the bed 16 independently of the piston 131. The bearings 110 and 144 are spaced apart axially along the columns 26 to very stably guide the columns independently of the piston. It can be seen that the central opening of the piston, indicated at 145, is of slightly larger diameter than column 26, so there can be some lateral shifting between the column 26 and the piston 131. The housing portion 123 of the clamp can thus move relative to the column 126 without binding the column against any portion of the bed 16. The piston floats and the bearings 110 and 144 provide independent slidable guides between the bed and the column.

The piston 131 and the cylinder assembly 133 form the power cylinder for molding or pressing forces, and also for stripping the mold. In molding sequence after changing the mold, the actuators 35 are controlled to close the mold, that is, the columns 26 slide through the modules 30 to proper position as controlled by feedback from the sensors 46. The clamp sleeves are clamped by pressure in chamber 127 to secure each housing 123 relative to the respective column 26.

Figure 1:
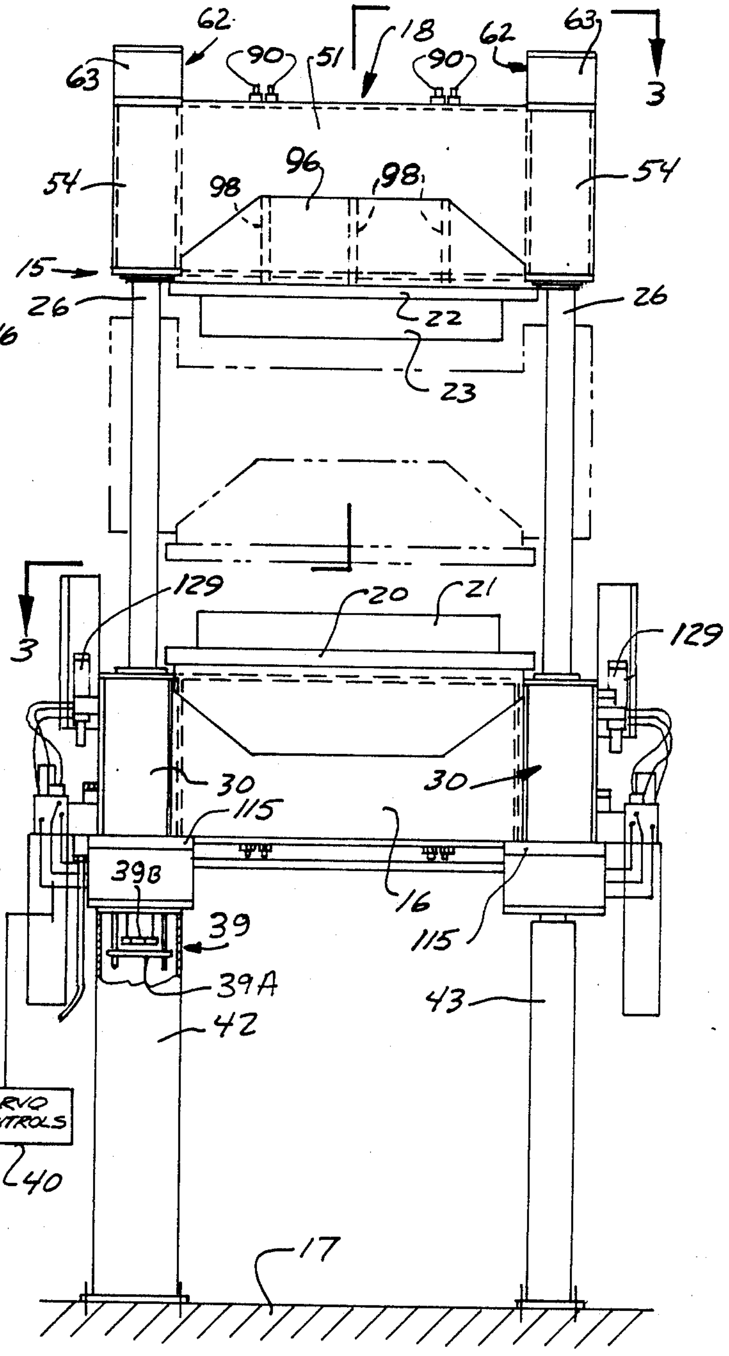
FIG. 1 is a front elevational view of a hydraulic press made according to the present invention.

Fluid under pressure is then introduced through the passageway 140, which will tend to move the head of the piston 131A away from the flange 137 formed in the cylinder, and this will then, because clamp sleeve 124 is clamped onto the column, cause the piston, clamp and column, and thus the entire ram 18 to be moved downwardly relative to the frame plate 115 and thus the bed 16. The piston will remain on the column 26 in fixed position and so will the clamp assembly. The force urges the ram downwardly from the mold closed position shown in dotted lines in FIG. 1. The servocontrols 40 are provided for adequately loading the power actuators to provide the necessary molding forces, and each of the power actuators on each of the columns 26 will be actuated simultaneously to mold the part. The piston will be moved away from flange 137 toward cover 143 as the molding progresses.

Once the molding is completed, the molded part has to be stripped from the molds by pushing the mold sections apart. Pressure is removed from port 140 after molding is completed, and pressure is applied to port 138. This creates a force acting against the lower end of the housing 123 relative to the upper surface of the flange 137 to urge the housing and piston back to its position shown in solid lines in FIG. 7, and this will provide the stripping force. The entire ram 18 will be moved up (away from bed 16). There is a sliding seal between the outer surface of the housing 123 and the inner surface of the upper portion of the cylinder 133 to carry the pressure that is necessary.

Substantially improved performance is achieved with the overall press configuration because of the light weight, rigid fabricated ram that can be moved quickly by the actuator 35 to its mold closed position, and then the ability to provide for independent alignment of the bed relative to the sliding columns 26 through the use of the bushings 144 and 110 that are not connected to the piston that is used, so that the piston can float slightly with respect to the columns to permit radial shifting if necessary during the clamping operation.

Further, the particular clamp with the interfitting inner and outer members insures that there will be no slipping of the two parts of the clamp relative to each other and that the column 26 will be held securely by the clamp sleeve and the clamp housing, so that movement of the ram for molding is with respect to a fixed reference.

The assembly of the end columns (at least two, one at each end), the bed having the power and guidance modules for slidably receiving the columns and the ram held at the ends of the column, provides a press structure that does not require a large cross head or crown. The columns are guided on the bed precisely and slight parallelograming can be tolerated without adversely affecting operation. There are no intermediate load reacting or guidance members.

Although the present invention has been described with reference to preferred embodiments, workers skilled in the art will recognize that changes may be made in form and detail without departing from the spirit and scope of the invention.

What is claimed is:

1. In a hydraulic press having a pair of relatively movable platen members for generating forces therebetween, the improvement comprising at least one of said platen members being supported relative to at least two elongated columns at opposite ends of the one platen member, said one platen member including a main frame extending between said columns, a plurality of spaced load pads mounted on a surface of the main frame at locations facing the other platen member and spaced inwardly from the ends of the main frame, and a flat platen clamped against the side of said main frame facing the other of said platen members and supported on the main frame only through the load pads at the locations, said flat platen having gusset means comprising walls fixed to the flat platen with planes perpendicular the plane of the flat platen to tend to distribute loads across the flat platen, said walls being connected to the main frame only through the load pads supporting the flat platen.

2. The improvement of claim 1 further comprising said main frame including a pair of rectangularly shaped tube members extending in direction between the columns, said rectangularly shaped tube members having a greater dimension parallel to the length of the columns than transversely to the columns, and draw bolt means mounted in each of said tube members and threadably engaging said flat platen to clamp the flat platen against load pads at the two locations, each of said tube members of said main frame having a pair of said load pads thereon.

3. The apparatus as specified in claim 2 wherein there are at least two columns at opposite ends of said main frame guidably mounted in a desired location relative to said main frame and each column being capable of transmitting forces for urging said main frame selectively toward and away from the other platen member, said other platen member having means to slidably guide the columns relative thereto, the one platen member being slidably guided relative to the other platen member only through the columns, first means for moving said one platen member toward and away from said other platen member, second means mounted relative to said other platen member for clamping said columns at a desired axial location, and piston and cylinder means being operative when said clamps have clamped onto said columns for permitting the generation of a force through said columns to said one platen member to urge said one platen member selectively against or away from the other platen member.

4. The improvement of claim 3 wherein said columns are connected to said one platen member adjacent upper ends of the columns, and at a side of said main frame of the one platen member spaced farthest from the other platen member, the connection between the one platen member and the columns comprising means for permitting limited swivel movement of each column relative to said one platen member, and guide means on the one platen member spaced from the swivel connection for slidably receiving said columns to maintain the orientation of the columns relative to the one platen member, said guide means including release means for carrying lateral loads on said column up to a desired level, after which said release means will release and said guide means will permit additional movement of said columns relative to said one platen member.

5. The improvement of claim 2 wherein each of said tube members has an internal bulkhead welded to at least portions of the walls of said tube members and aligning with the respective load pads on said tube members.

6. The improvement of claim 5 wherein the draw bolts are positioned on opposite sides of each of the bulkheads.

7. The apparatus as specified in claim 1 wherein said elongated columns are normally fixed relative to the one platen member to present movement of the columns relative to the one platen member in directions parallel to the columns when they are loaded to move the one platen member toward the other platen member, slidable guide means for slidably receiving said columns on said other platen member, the one platen being free of guides relative to the other platen member except through said columns, and clamp means and piston force generating means comprising portions of said slidable guide means, said clamp means and piston force generating means both surrounding the respective column, the piston force generating means for each column being fixed to the clamp means for the same column, said piston force generating means being mounted in an outer cylinder attached to the other platen whereby when said clamp means are clamped onto a respective column, the piston force generating means can be operated to apply loads on the columns to move the columns and the one platen member relative to the other platen member a desired distance.

8. The apparatus as specified in claim 7 and independent sliding bearing means spaced apart in direction along each of said columns and supported relative to the other platen member independently from said clamp means.

9. The improvement of claim 8 wherein the columns are mounted to said main frame through a limited swivel motion joint.

10. A press having a press bed and movable ram head, said ram head having a side that faces the press bed, and a width extending laterally of said press bed, said width ending in ram head end portions, a plurality of columns having longitudinal axes, at least one column being at each end portion of said ram head;

first means for connecting first ends of the columns to the ram head, said columns being operably connected to the press bed to carry loads through the columns and including means for urging said ram head toward said press bed when force is applied to the columns to place the columns in tension; and containment means mounted on each of the ram head end portions spaced along the column longitudinal axes in a direction toward the press bed from the means connecting first ends of the columns to the ram head end portions, for slidably holding each of said columns from excessive movement laterally of the longitudinal axis of the respective column to maintain the longitudinal axis of each such column at a desired, substantially fixed orientation with respect to the ram head until loads beyond a preselected maximum load in direction laterally of the longitudinal axis of the respective column are exerted on the respective column, after which the containment means includes means which permits limited movement between the ram head and the respective column.

11. The apparatus of claim 10 wherein said containment means includes a ring surrounding each of said columns for holding the columns in their fixed orientation, and release means coupling said ring to other portions of said containment means to permit limited movement of said columns relative to said ram head after the release means releases.

12. The press of claim 10 including separate piston and cylinder means associated with each column for moving said column and said ran head relative to said press bed.

13. The apparatus as specified in claim 10 wherein the means connecting the first ends of said columns to said ram head comprise a swivel motion carrying member to permit limited swivel motion of each column relative to the ram head, said containment means including guide means for rigidly holding the columns fixed to the ram head, and release means between the guide means and other portions of the containment means which release when the preselected maximum lateral load is exerted on the respective columns.

14. The apparatus as specified in claim 13 wherein each limited swivel motion carrying member comprises a housing having an internal chamber mounted on the upper side of the ram head, an elastomeric ring in the chamber of the housing surrounding an upper portion of the respective column, and bearing against a portion of the ram head, and a cap on the respective column positioned in the chamber and having a shoulder that engages the elastomeric ring and loads the ram head through said elastomeric ring when the column is under tension, said cap having tapered side edges contained within the chamber to permit limited swiveling movement of the cap relative to the chamber and ram head as the elastomeric ring compresses.

15. The press of claim 10 including a separate power and guidance module mounted on said press bed for receiving each of said columns, said power and guidance modules including clamp means to slidably receive the respective column, said clamp means being operable to clamp and release said columns to permit and prevent sliding motion of the columns relative to the clamp means, respectively, and power cylinder means coupled to said clamp means whereby upon clamping of the clamp means onto a column, said power cylinder means are operable to exert forces along the axes of said columns to move said columns and the ram head relative to the press bed.

16. The apparatus as specified in claim 15 wherein each of said power cylinder and guidance modules comprises a pair of plate members that are spaced apart a substantial distance along the axis of the respective column, said plate members each carrying a close-fitting sliding bushing for receiving the respective column to guide the respective column relative to the press bed independently of the clamp means and power cylinder.

17. The apparatus as specified in claim 15 wherein said ram head, said columns, said press bed, and said power cylinders and guidance modules comprise the entire press frame for generating force between the ram head and the press bed.

18. The apparatus as specified in claim 15 wherein said power cylinder means comprises a piston, said piston having a center opening, said column passing through the opening in the piston, and a cylinder mounted to one portion of said clamp means having a chamber receiving said piston, said cylinder also having an opening through which the column passes for permitting sliding movement of said column, the opening of said piston being of larger diameter than the column to permit the column and piston to move laterally relative to each other without binding.

19. The apparatus as specified in claim 18 wherein said clamp means comprises hydraulically operated clamp means, having an outer housing, and an inner sleeve that shrinks around the column when fluid under pressure is presented to the space between said sleeve and said outer housing.

20. A hydraulic press assembly comprising a bed member, said bed member being supported relative to a foundation;

at least one guidance module fixed at each end of said bed member, and spaced across the lateral width of the bed member;

a ram assembly for providing compressive forces with respect to said bed member, and movable toward and away from said bed member, said ram assembly comprising a ram head in registry with said bed member, and a plurality of columns having longitudinal axes, one column being mounted for axial sliding movement in each of said guidance modules at the opposite ends of said bed member, first ends of said columns being attached to said ram head through connections for carrying loads on said columns to move the ram head relative to the bed member;

first clamp means in said guidance modules for clamping said columns and retaining the columns from axial movement relative to the guidance modules;

cylinder means in the guidance modules connected to the first clamp means for exerting forces on the respective column relative to the bed in direction along the longitudinal axis of the respective column when the first clamp means have clamped onto such column; and separate means for moving said ram head and columns relative to the bed member and the guidance modules when the first clamp means are released from the columns, there being no other frame structures for guiding the ram assembly relative to the bed member other than the columns and guidance modules, and the columns being the only members for generating operating forces between the bed member and ram head through the clamp means and cylinder means.

21. The apparatus as specified in claim 20 wherein said guidance modules include sliding bearing support means spaced apart along the longitudinal axis of each of the respective columns, said clamping means and cylinder means being positioned between the sliding bearing means of the associated guidance modules.

22. The press of claim 20 wherein said cylinder means comprises piston members that are annular and surround the respective columns, said piston members having openings in the center thereof which are of larger size than the columns to permit lateral movement between the columns and the piston members when the clamping means are operated.

23. A fluid power press assembly comprising first and second press members, supported relative to each other with the first press member aligned with the second press member;

at least one guidance module fixed at each end of the first press member, and spaced across the lateral width thereof;

means for guiding the second press member for movement toward and away from the first press member comprising a plurality of columns having longitudinal axes, one column being mounted for axial sliding movement in each of said guidance modules at the opposite ends of said first member, first ends of said columns being attached to said second press member through connections for carrying loads on said columns to move the second press member relative to the first press member, said connections permitting limited angular movement of the longitudinal axis of the columns to permit the second press member to move laterally a limited distance relative to the first press member;

first clamp means in said guidance modules for clamping said columns and retaining the columns from axial movement relative to the guidance modules; and first pressure cylinder means connected between the first press member and the first clamp means for exerting forces on the respective column relative to the first press member in direction along the longitudinal axis of the respective column when the first clamp means have clamped onto such column, there being no other frame structures for guiding the first and second press members relative to each other, other than the columns and guidance modules, and the columns being the only members for carrying operating forces between the first and second press members through the clamp means and cylinder means.

24. The press assembly of claim 23 wherein said fluid pressure cylinder means are integrated into the guidance modules.

* * * * *